United States Patent
Demuth et al.

(10) Patent No.: US 10,272,592 B2
(45) Date of Patent: Apr. 30, 2019

(54) CERAMIC SUPPORT STRUCTURE

(71) Applicant: Stratasys, Inc., Eden Prairie, MN (US)

(72) Inventors: Benjamin A. Demuth, River Falls, WI (US); Adam R. Pawloski, Lake Elmo, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 16/057,171

(22) Filed: Aug. 7, 2018

(65) Prior Publication Data

US 2018/0339426 A1 Nov. 29, 2018

Related U.S. Application Data

(63) Continuation of application No. 15/968,123, filed on May 1, 2018, now Pat. No. 10,059,031, which is a continuation of application No. 14/776,007, filed as application No. PCT/US2014/027775 on Mar. 14, 2014, now Pat. No. 10,022,889.

(60) Provisional application No. 61/781,997, filed on Mar. 14, 2013.

(51) Int. Cl.
| | |
|---|---|
| *B28B 1/00* | (2006.01) |
| *D01F 1/02* | (2006.01) |
| *C04B 35/634* | (2006.01) |
| *B28B 11/24* | (2006.01) |
| *C09D 5/00* | (2006.01) |
| *C09D 123/08* | (2006.01) |
| *C04B 35/524* | (2006.01) |
| *C04B 35/626* | (2006.01) |
| *B29C 64/106* | (2017.01) |
| *C04B 35/622* | (2006.01) |
| *C09D 7/61* | (2018.01) |
| *C04B 38/04* | (2006.01) |
| *B29K 309/02* | (2006.01) |
| *B33Y 10/00* | (2015.01) |
| *B33Y 70/00* | (2015.01) |
| *C08K 3/26* | (2006.01) |
| *C04B 111/40* | (2006.01) |

(52) U.S. Cl.
CPC ............ *B28B 1/001* (2013.01); *B28B 11/243* (2013.01); *B29C 64/106* (2017.08); *C04B 35/524* (2013.01); *C04B 35/62227* (2013.01); *C04B 35/62695* (2013.01); *C04B 35/634* (2013.01); *C04B 35/63408* (2013.01); *C04B 38/04* (2013.01); *C09D 5/00* (2013.01); *C09D 7/61* (2018.01); *C09D 123/0815* (2013.01); *D01F 1/02* (2013.01); *B29K 2309/02* (2013.01); *B33Y 10/00* (2014.12); *B33Y 70/00* (2014.12); *C04B 2111/40* (2013.01); *C04B 2235/3201* (2013.01); *C04B 2235/3203* (2013.01); *C04B 2235/3208* (2013.01); *C04B 2235/3222* (2013.01); *C04B 2235/3232* (2013.01); *C04B 2235/3244* (2013.01); *C04B 2235/3418* (2013.01); *C04B 2235/365* (2013.01); *C04B 2235/442* (2013.01); *C04B 2235/445* (2013.01); *C04B 2235/449* (2013.01); *C04B 2235/602* (2013.01); *C04B 2235/604* (2013.01); *C04B 2235/6021* (2013.01); *C04B 2235/6026* (2013.01); *C04B 2235/94* (2013.01); *C08K 3/26* (2013.01); *C08K 2003/265* (2013.01)

(58) Field of Classification Search
CPC ....... B28B 1/001; B28B 11/243; C04B 38/04; C04B 35/62227; C04B 35/63408; C04B 35/634; C04B 35/62695; C04B 35/524; C04B 2111/40; C04B 2235/3203; C04B 2235/3201; C04B 2235/449; C04B 225/94; C04B 2235/445; C04B 2235/365; C04B 2235/442; C04B 2235/3418; C04B 2235/3244; C04B 2235/3232; C04B 2235/3222; C04B 2235/3208; C04B 2235/602; C04B 2235/6021; C04B 2235/6026; C04B 2235/604; C09D 7/61; C09D 5/00; C09D 123/0815; D01F 1/02; B29C 64/106; C08K 3/26; C08K 2003/265; B33Y 70/00; B33Y 10/00; B29K 2309/02
See application file for complete search history.

(56) References Cited

U.S. PATENT DOCUMENTS

| | | | |
|---|---|---|---|
| 4,789,507 A | * | 12/1988 | Wesley ............... B29C 47/367 264/176.1 |
| 5,336,532 A | | 8/1994 | Haluska et al. |
| 5,738,817 A | | 4/1998 | Danforth et al. |
| 5,753,274 A | | 5/1998 | Wilkening et al. |
| 5,855,995 A | | 1/1999 | Haq et al. |
| 5,897,825 A | | 4/1999 | Fruth et al. |
| 5,900,207 A | | 5/1999 | Danforth et al. |
| 6,146,743 A | | 11/2000 | Haq et al. |

(Continued)

FOREIGN PATENT DOCUMENTS

| | | |
|---|---|---|
| CN | 101422963 A | 5/2009 |
| CN | 102186918 A | 9/2011 |

(Continued)

OTHER PUBLICATIONS

Chinese Office Action dated Jan. 8, 2018 for corresponding Chinese Application No. 201480026474.1, filed Nov. 10, 2015.

(Continued)

*Primary Examiner* — Nahida Sultana
(74) *Attorney, Agent, or Firm* — Peter J. Ims; Westman, Champlin & Koehler, P.A.

(57) ABSTRACT

A pre-ceramic support structure for additive manufacturing, that upon thermal processing, is soluble in various solvents.

23 Claims, No Drawings

(56) References Cited

U.S. PATENT DOCUMENTS

| | | |
|---|---|---|
| 6,311,359 B1 | 11/2001 | Brezler, III |
| 6,645,412 B2 | 11/2003 | Priedeman, Jr. |
| 7,326,381 B1* | 2/2008 | Pope .................. C08G 77/60 |
| | | 264/434 |
| 8,246,888 B2 | 8/2012 | Hopkins et al. |
| 8,647,098 B2 | 2/2014 | Swanson et al. |
| 9,022,771 B2 | 5/2015 | Swanson et al. |
| 10,022,889 B2* | 7/2018 | Demuth ................ D01F 1/02 |
| 2002/0017743 A1 | 2/2002 | Priedeman, Jr. |
| 2002/0165332 A1* | 11/2002 | Pope ................ C01B 21/0637 |
| | | 528/25 |
| 2002/0167118 A1 | 11/2002 | Billiet et al. |
| 2003/0011648 A1 | 1/2003 | Kabalnov et al. |
| 2003/0065400 A1 | 4/2003 | Beam et al. |
| 2005/0087902 A1 | 4/2005 | Farr et al. |
| 2005/0212163 A1 | 9/2005 | Bausinger et al. |
| 2005/0269254 A1 | 12/2005 | Roltman |
| 2006/0158456 A1 | 7/2006 | Zinniel et al. |
| 2007/0141933 A1 | 6/2007 | Wevers et al. |
| 2008/0008894 A1* | 1/2008 | Abdo ................... C04B 33/24 |
| | | 428/469 |
| 2009/0206500 A1 | 8/2009 | Maguire et al. |
| 2010/0113249 A1* | 5/2010 | Beauseigneur ...... C04B 35/185 |
| | | 501/80 |
| 2010/0133249 A1 | 6/2010 | Jaeschke |
| 2010/0140849 A1 | 6/2010 | Comb et al. |
| 2010/0145469 A1 | 6/2010 | Barralet et al. |
| 2010/0249305 A1 | 9/2010 | Laubersheimer et al. |
| 2011/0064784 A1 | 3/2011 | Mullens et al. |
| 2012/0070523 A1 | 3/2012 | Swanson et al. |
| 2012/0177831 A1 | 7/2012 | Dawes et al. |
| 2012/0258250 A1 | 10/2012 | Rodgers |
| 2012/0308837 A1 | 12/2012 | Schlectriemen et al. |
| 2012/0325403 A1 | 12/2012 | Chereau et al. |
| 2014/0120197 A1 | 5/2014 | Swanson et al. |
| 2014/0141166 A1 | 5/2014 | Rodgers |
| 2014/0141168 A1 | 5/2014 | Rodgers |
| 2015/0122373 A1 | 5/2015 | Bourgeois et al. |
| 2015/0247077 A1* | 9/2015 | Kepley ................ C09D 183/14 |
| | | 524/404 |
| 2015/0251353 A1 | 9/2015 | Rodgers et al. |
| 2016/0039194 A1 | 2/2016 | Cable |
| 2016/0122541 A1 | 5/2016 | Jaker et al. |
| 2016/0144573 A1 | 5/2016 | Hirata et al. |
| 2016/0229128 A1 | 8/2016 | Dayagi et al. |
| 2016/0271698 A1 | 9/2016 | Schmidt |
| 2016/0289468 A1 | 10/2016 | Turner |
| 2016/0312022 A1 | 10/2016 | Nessner et al. |
| 2016/0318249 A1 | 11/2016 | Kochesfahani |
| 2016/0339518 A1 | 11/2016 | Nardi et al. |
| 2017/0297103 A1 | 10/2017 | Myerberg et al. |

FOREIGN PATENT DOCUMENTS

| | | |
|---|---|---|
| WO | 2010045147 A2 | 4/2010 |
| WO | 2013148024 A1 | 10/2013 |

OTHER PUBLICATIONS

Chinese Office Action dated Jul. 10, 2017 for corresponding Chinese Application No. 201480026474.1, filed Nov. 10, 2015.

Chinese Office Action dated Mar. 17, 2017 for corresponding Chinese Application No. 201480026474.1, filed Nov. 10, 2015.

Supplementary European Search Report dated Sep. 28, 2016 for corresponding European Application No. 14769394.9, filed Sep. 11, 2015.

Chinese Office Action dated Sep. 5, 2016 for corresponding Chinese Application No. 201480026474.1, filed Nov. 10, 2015.

International Search Report dated Aug. 18, 2014, for corresponding International Application No. PCT/US2014/027775, filed Mar. 14, 2014.

European Communication dated May 22, 2018 for corresponding European Application No. 14769394.9, filed Sep. 11, 2015.

* cited by examiner

CERAMIC SUPPORT STRUCTURE

CROSS-REFERENCE TO RELATED APPLICATIONS

This Application is a continuation application of U.S. patent application Ser. No. 15/968,123, filed May 1, 2018, which is a continuation application of U.S. patent application Ser. No. 14/776,007, filed Sep. 14, 2015, and published as U.S. Pat. No. 10,022,889 which is a 371 National Stage Application of International Application No, PCT/US2014/027775, filed on Mar. 14, 2014, published as International Publication No. WO 2014/152798 A1, which claims priority to U.S. Provisional Patent Application No. 61/781,997, filed on Mar. 14, 2013, the contents of which are incorporated by reference in their entireties.

TECHNICAL FIELD

The disclosure is related to the use of a melt processable pre-ceramic materials for applications as a support structure in additive manufacturing.

BACKGROUND

Additive manufacturing technology, also recognized as three dimensional printing technology, builds three-dimensional objects through layer-by-layer deposition of thermoplastic materials. A plastic filament is utilized to deliver materials to an extrusion nozzle. The nozzle is heated to melt the material and can be moved in both horizontal and vertical directions by computer control. The three dimensional object is produced by extruding small beads of thermoplastic material to form layers. The layers of thermoplastic material harden after extrusion. Support materials are often employed to assist in building certain three dimensional objects. The support structures are thermoplastic materials that can be removed from contact with other extruded materials by physical or chemical means. Certain support materials are selectively soluble in certain liquids. The composition of a thermoplastic support materials and the liquid can be selected so that the liquid dissolves the support material, but not the intended material of construction for the desired object.

SUMMARY

One embodiment involving additive manufacturing of ceramics is a process where thermoplastic filaments of pre-ceramic powders are extruded to form a three dimensional article. In certain applications of additive manufacturing, a sacrificial "support" layer is utilized to assist in forming "build" layers that create the intended three-dimensional product. The support layer will be subsequently removed to create a final object. During the additive manufacturing of ceramics in accordance with this disclosure, thermoplastic polymers carry the pre-ceramic powders to form three-dimensional green ceramic parts that contain the thermoplastic binder. For purposes of this disclosure, the thermoplastic polymers with the pre-ceramic can be intended as either the support layer as well as the build layer. The parts are then subjected to a binder removal and sintering cycle during firing of the object, resulting in certain embodiments in ceramification. Due to the elevated temperatures for sintering, conventional thermoplastic support layers are not suitable simply because the temperatures are far above the degradation temperatures of the polymer. The degradation of the support structure in turn may adversely affect the build layer and the intended article. This has limited the types of three-dimensional ceramic objects produced utilizing conventional additive manufacturing practices.

This disclosure is directed to the use of a pre-sintered support layer or structure for additive manufacturing, that upon firing or sintering, is soluble in various solvents. The compositions are additive manufacturing feedstocks, having a polymeric matrix and a pre-ceramic compound, wherein the post-sintered support layer is soluble or removable in a solvent. In general, the feedstocks are produced using melt processing techniques to form filaments that are suitable in applications with additive manufacturing processes and equipment.

For purposes of this disclosure, ceramic means a material that has been subject to a thermal process, or firing, to form an anhydrous or substantially anhydrous material. A green ceramic is a material that has not been subjected to a thermal process. Green ceramifiable articles can be produced with additive manufacturing wherein a pre-sintered build layer is supported by a pre-sintered support layer. Upon firing of the green article, the polymeric binders from both the build and support layers are removed by thermal degradation, and in doing so, the build layer is transformed into a ceramic composition by additional thermal processing or sintering. The support layer maintains shape and structural support of the build layer during this process. With the removal of polymeric binder, the remaining material of the support layer is soluble or removable in a solvent. The entire object of the now ceramic support structure can be subject to a solvent where it is removed, thereby leaving the finished ceramic article formed by the build layer.

DETAILED DESCRIPTION

A pre-sintered support structure for additive manufacturing can be used to assist in the formation of three-dimensional ceramic articles. The feedstocks for the pre-sintered support structure are produced using melt processing techniques to form, in certain embodiments, filaments that are suitable in applications with additive manufacturing processes and equipment. The support structure filaments are employed with build structure filaments to create three-dimensional objects by additive manufacturing.

In certain embodiments, green ceramifiable articles may be produced with additive manufacturing techniques. The green ceramifiable article is supported by a support composition of a polymeric matrix and a pre-ceramic compound. Upon firing of the green article at elevated temperatures, the entire object including the post sintered support structure can be subject to a solvent bath where the ceramic support structure is removed, thereby leaving the finished ceramic article.

The support layer feedstock intended as the support structure is primarily a pre-ceramic powder or powder blend in a polymeric matrix. The polymer serves as a binder for the pre-ceramic powder or powder blend. The polymeric matrix imparts the necessary strength for the creation of a molded or printed support structure. Additionally, it imparts the desired physical properties required to make the feedstock for the additive manufacturing process. The polymeric matrix may be any thermoplastic polymer capable of melt processing and functioning as a feedstock for additive manufacturing. They include both hydrocarbon and non-hydrocarbon polymers. In certain embodiments, the polymeric matrix may be a polyethylene, an ethylene-octene copolymer. or combinations thereof. Other non-limiting examples of polymeric matrices include other polyolefins, polylactic acid polymers, and acrylonitrile butadiene styrene polymers or combinations thereof. The polymeric matrix may be included in the pre-ceramic feedstock in amounts ranging from about 0.1% to about 25% by weight. In certain embodiments, the polymeric matrix may be included at about 0.5% to about 5% by weight. In some embodiments, the feedstock is generally in the form of an extruded filament.

The pre-ceramic materials suitable for additive manufacturing are powders or micron sized compounds that are soluble in either a pre-ceramic or sintered state in various solvents. In some embodiments, the pre-ceramic is an acid labile mineral capable of forming a semi-solid under high heat. The intended application suggests that in certain embodiments the support structure, upon formation, must not soften below 700° C. Additionally, the support structure must not melt below 1200° C. Non-limiting examples of pre-ceramic materials include calcium carbonate, sodium carbonate, sodium aluminate or calcium carbide. Those of ordinary skill in the art with knowledge of this disclosure are capable of selecting a specific material to match the intended additive manufacturing article. For example, in applications where sintering does not exceed 850° C. sodium carbonate may also be used. In applications exceeding the 950° C. limits of calcium carbonate, sodium aluminate may be used up to 1500° C. In applications requiring extreme heat, calcium carbide may be employed, up to 2000° C. The amount of pre-ceramic material in the feedstock may be at least 50%. In certain embodiments the pre-ceramic material is greater than 75% and even greater than 95%.

In some embodiments, a flux is used to reduce the overall melting point of the pre-ceramic material and thereby enhance the efficiency of the sintering process. The flux may be any glass or ceramic material, which flows below the softening point of the pre-ceramic material. Non-limiting examples of flux materials include glass frits comprised of boron trioxide, silicon oxide, zirconium dioxide, lithium oxide, fluorine, titanium dioxide, and combinations thereof. The flux may be included in the feedstock composition in amounts up to 20%. In one embodiment, a suitable flux is Ferro Frits 90 740 F from the Ferro Corporation, Frankfurt, Del. In another embodiment, the flux may include silicates with melting points from 600° C. to 1000° C. The flux may be added to the feedstock during melt processing.

In alternative embodiment, various processing additives may be utilized in the formation of the feedstock. Non-limiting examples of processing aids include waxes, moisture scavengers, lubricants and debinders. The processing additives are included in the melt processable composition in an amount of about 0.5 wt % to about 5 wt %.

The components comprising the feedstock are blended and subjected to melt processing. The feedstock can be pelletized and then subsequently formed into a filament suitable for additive manufacturing. In some embodiments, the filament has a modulus of approximately 300 MPa to 1600 MPa.

The melt processing of the feedstock is generally performed in a twin-screw extruder. In certain embodiments, the processing is performed in co-rotating, segmented twin-screw extruder. In such instances, the length:diameter ratio of the twin screw extruder is at least 32:1. In another embodiment, the length:diameter ratio of the twin screw extruder is at least 40:1. Typical temperature profiles may range from 120-220° C. with typical screw speeds potentially in the range of about 200-300 RPM. Die pressures can be minimized to ensure incorporation of all pre-ceramic materials into the thermoplastic binder. Those who are skilled in the art will recognize preferred screw designs and temperature profiles to achieve optimal blending of the melt processable compositions of this invention.

The feedstock containing pre-ceramic materials is used in additive manufacturing as a support structure for ceramic articles. The support structure or layers are utilized with build layers to form a three-dimensional article or object. The materials are capable of withstanding the elevated temperatures necessary to place a green ceramic article into its desired ceramic form. Those of ordinary skill in the art are capable of selecting an appropriate feedstock to match a particular ceramic. Additionally, additive manufacturing equipment and techniques may be selected depending upon the desired finished article. One example of an additive manufacturing device is a Makerbot Replicator 2X additive manufacturing printer, available from Stratasys Ltd, Minneapolis, Minn.

An article created with a pre-sintered build structure, along with the pre-sintered support structure or layer, is fired at elevated temperatures. During the firing of the green ceramic article the support structure or layers withstand the elevated temperatures and do not deform and thereby do not adversely affect the intended ceramic article. The support structure or layers may then be removed in suitable solvents. The removal of the support structure or layers results in the finished ceramic article. Suitable solvents will depend upon the pre-ceramic material used in the feedstock. Non-limiting examples include:

water, carbonated solutions, and acidic solutions. Those of ordinary skill in the art are capable of selecting a specific solvent based on the pre-ceramic material selected in the feedstock.

EXAMPLES

| Material | Supplier |
|---|---|
| PE1 | Engage 8003, ethylene-octene copolymer. commercially available from Dow Chemical Corporation. Midland. MI. |
| Calcium Carbonate | GLC-1012d. 12 micron $CaCO_3$. commercially available from Great Lakes Calcium, Green Bay. WI. |

Compounding Procedure for Example 1

For Example 1. ethylene-octene copolymer resin PEL and Calcium Carbonate powder were dry blended and then fed using a gravimetric feeder into a 27 mm co-rotating twin screw extruder (32:1. L:D) fitted with a strand die (commercially available from Leistritz Corporation. Allendale. N.J.). Samples were processed with a screw rotational speed of 250 rpm using the following temperature profile: Zone 1-10=180° C. Die=160° C. The resulting strands of extrudate were subsequently continuously processed onto a belt, cooled to room temperature by fans, and pelletized into 0.64 cm pellets. The resulting pellets were used to press 6 mm square plaques. 6 mm in depth.

Pressing Procedure for CE1 and Example 2

Plaques in Example 2 were made using a heated platen hydraulic press (commercially available from Dake Corporation. Grand Haven. Mich.). Approximately 110 g of pellets from example 1 were spread in an aluminum frame equating to the dimensions previously listed, and covered with aluminum foil. The top and bottom platens, heated to 175° C. were made to contact the pellets of example 1 in the aluminum frame for 3 min. under minimal pressure. After 3 min, 15 tons of pressure was applied to the material for 5 min. after which time, the material was removed and allowed to cool to room temperature at an unspecified rate. This procedure was repeated using, previously demonstrated, ceramifiable polymer to produce 10×10×0.6 cm plaques of CE1

Three aluminum frames were stacked vertically. A plaque of CE1 was placed in the bottom. The plaque of example 1 was cut into a cross of equal legs, 5 cm wide with an outer diameter of 4 inches, fitting into the aluminum frame previously used. Pellets of a ceramifiable material used to make CE1 were placed in the cavities of the second frame. A third plaque of CE1 was placed on top and the sample pressing procedure was followed to make example 2. Example 2 having final dimensions of 10×10×0.6 cm, made of CE1 and having a cross of example 1 centered internally.

Ceramification and Dissolution of Example 2 into Example 3

Example 2 was heated in a muffle furnace (commercially available from ThermoFisher Scientific Corporation, Weldham, Mass.) to 950° C. for 20 min at an unspecified rate. This material was removed from the furnace and allowed to cool to room temperature at an unspecified rate. This conversion yielded a wholly ceramified, intact article of similar initial dimensions of example 2. Upon immersion in a water bath, the CaCO3 material from example 1 was entirely dissolved leaving example 3 of dimensions equal to the CE1 material only, in example 2.

Example 4

A filament containing a pre-ceramic material suitable as a support layer, is extruded in a manner similar to that of Example 1, and wound onto a spool. A second filament containing a pre-ceramic material suitable as a build layer is also produced in a manner similar to Example 1 and wound onto a spool. The spools are loaded into a MakerBot Replicator 2X additive manufacturing printer, available from Stratasys Ltd. Minneapolis. Minn. The filament from each spool is fed into the MakerBot 2X extruder nozzles in accordance with the printers loading procedures.

A CAD file of a three-dimensional article requiring a support layer and a build layer with 90° overhangs of the build layer is selected and loaded into the MakerBot 2X.

The loaded filaments are printed at temperature of about 160 to 200° C. and at printing speeds ranging between 20 and 100 mm/sec with acceleration enabled. The materials are printed onto a standard Kapton tape heated to about 100° C. Filament are printed with an infill between 5 and 95%. Layer heights are between 0.10 and 0.35 mm.

The printed article having a build and support layer constructed from pre-ceramic filaments is subjected to a thermal treatment. The printed article is placed in a muffle furnace and heated to about 450° C., under an inert, oxidizing, or reducing gas, to thermally remove any thermoplastic material and water. The printed article is then further heated to in excess of 750° C. under an inert, oxidizing, or reducing gas, to enable sintering and thereby create a ceramic, or substantially ceramic, article.

The article is cooled at an appropriate rate so as not to produce thermal cracking or warping. The article does not exhibit any warping of either the support layer or the build layer. The structure of the build layer is supported by the support layer material that remains post-thermal treatment. The article is then submersed in an appropriate solvent to dissolve or disperse the support layer. The article comprising the remaining build material is removed from solvent and dried.

Table 1 gives the formulations for example 1

TABLE 1

| Formulation for Example 1 | | |
|---|---|---|
| | PE1 | CaCO3 |
| CE1 | 25 | 75 |

What is claimed is:

1. A feedstock material for use as a support material in an additive manufacturing system, the feedstock material comprising:
   a pre-ceramic material in powder form; and
   a thermoplastic binder having the pre-ceramic material dispersed therein, wherein the pre-ceramic material and the thermoplastic binder are in a filament form, wherein the pre-ceramic material is at least about 50% by weight of the feedstock material;
   wherein the filament is configured to be melted and extruded to provide support for an article being printed in a layer by layer manner.

2. The feedstock material of claim 1, wherein the thermoplastic binder is a polymeric matrix comprising one or more of polyolefins, polylactic acid polymers, and acrylonitrile butadiene styrene polymers or combinations thereof.

3. The feedstock material of claim 1, wherein the thermoplastic binder comprises up to 25% by weight of the feedstock material.

4. The feedstock material of claim 1, and further comprising one or more fluxing materials, a polymer processing additive or combinations thereof.

5. The feedstock material of claim 4, wherein the fluxing material comprises glass frits having boron trioxide, silicon oxide, zirconium dioxide, lithium oxide, fluorine, titanium dioxide, and combinations thereof.

6. The feedstock material of claim 1, wherein the pre-ceramic material comprises calcium carbonate, sodium carbonate, sodium aluminate or combinations thereof.

7. The feedstock material of claim 1, wherein the extruded feedstock material does not soften below 700 degrees C.; and does not melt below 1200 degrees C.

8. A method of building a part with additive manufacturing comprising:
   printing the part wherein the part comprises at least one build layer;
   printing a support structure comprising at least one support layer, the support structure configured to provide support to the part, wherein the support structure comprises a feedstock material comprising a pre-ceramic material and a polymeric binder, wherein the pre-ceramic material is at least about 50% by weight of the feedstock material;
   heating the part and the support structure to a first temperature to remove the polymeric binder through thermal degradation; and sintering the support material at a second temperature that is higher than the first temperature to ceramify the support structure.

9. The method of claim 8, and further comprising:
subjecting the ceramic support structure to a solvent to remove the ceramic support structure from the part.

10. The method of claim 8, wherein the solvent comprises water, carbonated solutions, acidic solutions and combinations thereof.

11. The method of claim 8, wherein the polymeric binder is a matrix comprising one or more of polyolefins, polylactic acid polymers, and acrylonitrile butadiene styrene polymers or combinations thereof.

12. The method of claim 8, wherein the pre-ceramic material comprises calcium carbonate, sodium carbonate, sodium aluminate or combinations thereof.

13. The method of claim 8, wherein the feedstock material is a filament configured for building a three-dimensional support structure.

14. The method of claim 8, wherein the feedstock material further comprises one or more of a fluxing materials, a polymer processing additive or combinations thereof.

15. The method of claim 8, wherein a feedstock material for the part comprises a pre-ceramic material within a polymeric binder.

16. The method of claim 8, wherein the polymeric binder is removed from the part as the polymeric binder is removed from support structure.

17. The method of claim 16, wherein the part is sintered as the support material is sintered.

18. A method of building a part with additive manufacturing comprising:

printing the part wherein the part comprises at least one build layer;

printing a support structure comprising a plurality of layers, the support structure configured to provide support to the part, wherein the support structure comprises a feedstock material comprising a pre-ceramic material and a polymeric binder, wherein the pre-ceramic material is at least about 50% by weight of the feedstock material;

heating the part and the support structure to a first temperature to remove the polymeric binder through thermal degradation; and sintering the support material at a second temperature that is higher than the first temperature to ceramify the support structure.

19. The method of claim 18, wherein the feedstock material is a filament configured for building a three-dimensional support structure.

20. The method of claim 18, wherein the feedstock material further comprises one or more of a fluxing materials, a polymer processing additive or combinations thereof.

21. The method of claim 18, wherein a feedstock material for the part comprises a pre-ceramic material within a polymeric binder.

22. The method of claim 18, wherein the polymeric material is removed from the part as the polymeric material is removed from support structure.

23. The method of claim 22, wherein the part is sintered as the support material is sintered.

* * * * *